XR 2,753,527

13

X 89365

(2)

July 3, 1956 R. ADLER 2,753,527

ELECTROMECHANICAL PULSE-STORAGE LINES

Filed March 10, 1951 4 Sheets-Sheet 1

INVENTOR.
ROBERT ADLER
BY Francis W. Crotty
ATTORNEY

INVENTOR.
ROBERT ADLER
BY Francis W. Crotty
ATTORNEY

ELECTROMECHANICAL PULSE-STORAGE LINES

Filed March 10, 1951 4 Sheets-Sheet 3

INVENTOR.
ROBERT ADLER
BY Francis W. Crotty
ATTORNEY

INVENTOR.
ROBERT ADLER
BY Francis W. Crotty
ATTORNEY

United States Patent Office 2,753,527

Patented July 3, 1956

2,753,527

ELECTROMECHANICAL PULSE-STORAGE LINES

Robert Adler, Northfield, Ill., assignor to Zenith Radio Corporation, a corporation of Illinois Application March 10, 1951, Serial No. 214,881

10 Claims. (Cl. 333—30)

This invention relates to synchronizing systems and more particularly to systems for maintaining scanning synchronism in a television receiver or the like.

In accordance with conventional practice, a transmitted television signal comprises video-signal components and synchronizing-signal components alternating in time sequence. The video-signal components are representative of the picture information while the synchronizing-signal components are indicative of the timing of the scan. For proper reproduction of the image, it is necessary not only that the video-signal components be detected and applied to an image-reproducing device but also that some system be employed for maintaining the scanning operation at the receiver in synchronism with that employed at the transmitter.

In accordance with one known receiver synchronizing system, the incoming synchronizing-signal pulses are employed to trigger directly a pair of scanning-signal generators which in turn are coupled to a deflection system associated with the image-reproducing device to effect scanning in two coordinate directions. One inherent difficulty with a system of this type is its inability to operate in the absence of incoming pulses. If for any reason one or more line-frequency synchronizing-signal pulses fail to reach the synchronizing circuits, the line-frequency scanning-signal generator falls out of synchronism and a corresponding portion of the reproduced image is lost, a phenomenon commonly referred to as "tearing out" of the image.

In order to prevent tearing out of the image under normal operating conditions, most commercially produced television receivers at the present time employ some type of automatic frequency control in the line-frequency synchronizing system. In general, the incoming line-frequency synchronizing-signal pulses are compared in phase with a signal produced by a local oscillator operating at a free-running frequency approximating the repetition frequency of the line-synchronizing pulses. A unidirectional control signal from the phase-comparing device, representative of the phase difference between the synchronizing pulses and the locally-generated signal, is first smoothed by a filter and then applied to a reactance tube or is otherwise employed to control the operating frequency of the local oscillator. The frequency-controlled output of the local oscillator is used to drive the line-frequency scanning-signal generator. The effect of such automatic frequency control is to render the scanning system jointly responsive to the synchronizing-signal pulses extending over a number of line intervals, so that image reproduction is not disturbed by the loss of several successive synchronizing pulses.

While automatic frequency control systems are quite effective and permit high quality image reproduction, their use involves a considerable additional expense as compared with the simpler but less effective system of triggered synchronization. Numerous proposals have been made in an effort to obtain the benefits of automatic frequency control at reduced cost. One such system employs a passive oscillatory circuit or ringing circuit tuned to the repetition frequency of the line-synchronizing pulses. Such circuits integrate the effect of individual synchronizing pulses. With circuits of this type, however, a compromise must be made between the number of line intervals which may be integrated and the stability of picture centering. A ringing circuit of high Q is desirable to provide effective noise discrimination, but high Q also results in large phase shifts whenever the line-frequency varies. As an improvement over the simple ringing circuit, it has been suggested to employ a synchronized oscillator circuit responsive to the line-synchonizing pulses so that the effective Q is a function of signal intensity and becomes high only at very weak signals when the problem of noise discrimination is aggravated.

It has also been suggested that an electrical delay line, mismatched at one or both ends, may be employed in place of the ringing circuit to effect noise discrimination. While systems of this type are technically operable, the cost and the space requirements of an electrical delay line, of either distributed or lumped constants, are so great as to be prohibitive.

It is, therefore, an important object of the present invention to provide an improved synchronizing system for a television receiver or the like.

Another object of the invention is to provide a new and improved synchronizing apparatus which affords performance comparable with that of an automatic-frequency-control synchronizing system at reduced cost.

It is a further object of the invention to provide a new and improved type of electromechanical pulse-storage line, particularly although not exclusively useful for noise discrimination in the synchronizing circuits of a television receiver or the like.

In accordance with the invention, such a new and improved electromechanical pulse-storage line comprises a composite line structure composed of an electromechanical input transducer, an electromechanical output transducer positioned adjacent to the input transducer, and at least one passive vibratory element, all mechanically intercoupled to provide a closed path for wave propagation, each of the transducers constituting an intermediate portion of the composite line structure.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figures 1, 2, 3:
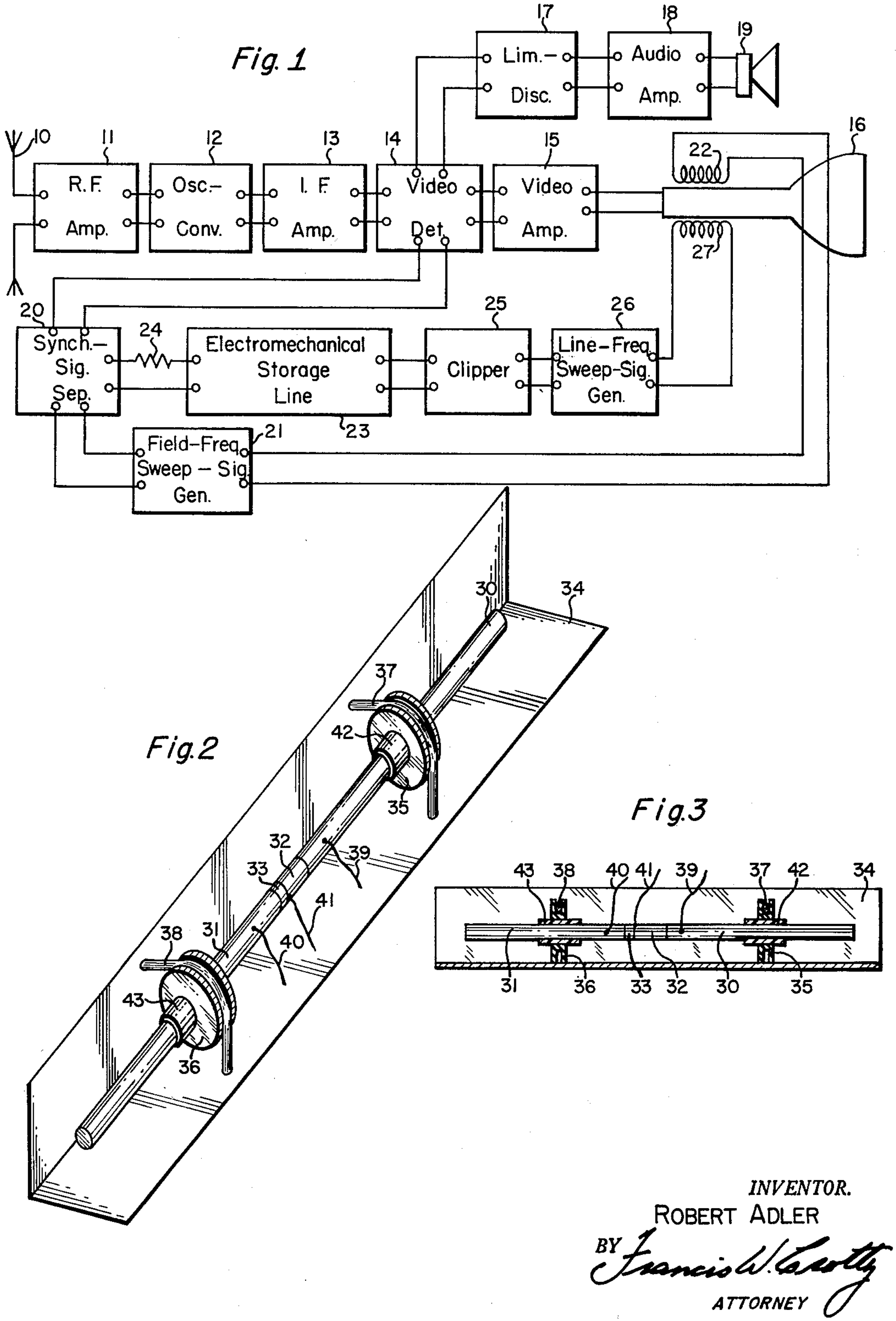
Figure 1 is a schematic diagram of a television receiver employing a synchronizing system constructed in accordance with the invention.
Figure 2 is a perspective view of an electromechanical pulse-storage line constructed in accordance with the invention.
Figure 3 is a side elevation, partly in section, of the pulse-storage line of Figure 2.

In the television receiver of Figure 1, incoming signals intercepted by an antenna 10 are amplified by means of a radio-frequency amplifier 11, and the amplified signals are applied to an oscillator-converter 12. Intermediate-frequency signals from oscillator-converter 12 are amplified by means of an intermediate-frequency amplifier 13 and detected by a video detector 14. The detected composite video signal from video detector 14 is amplified by means of a video amplifier 15 and applied to the input circuit of a cathode-ray tube 16 or other image-reproducing device. Intercarrier sound signals are applied from video detector 14 to a limiter-discriminator 17, and the detected audio signals are amplified by means of an audio amplifier 18 and applied to a loudspeaker 19 or other sound-reproducing device.

The composite video signal from video detector 14 is also applied to a synchronizing-signal separator 20. Field-frequency synchronizing-signal pulses from synchronizing-signal separator 20 are employed to drive a field-frequency sweep-signal generator 21 which in turn is coupled to the field-frequency deflection coils 22 associated with image-reproducing device 16.

Line-frequency synchronizing-signal pulses from synchronizing-signal separator 20 are impressed on the input terminals of an electromechanical pulse-storage line 23 through an integrating resistor 24. The construction and operation of pulse-storage line 23 are described in greater detail hereinafter; fundamentally, a pulse-storage line is distinguished from a simple delay line in that the application of a single pulse to the input terminals results in a train of output pulses mutually spaced by a constant predetermined time interval. The output pulses are of similar shape and of exponentially decreasing amplitude. The output of electromechanical pulse-storage line 23 is impressed on the input circuit of an amplitude-selective device or clipper 25 the output of which is employed to drive a line-frequency sweep-signal generator 26 which in turn is coupled to the line-frequency deflection coils 27 associated with image-reproducing device 16.

The construction and operation of the receiver of Figure 1 are entirely conventional with the exception of the line-frequency synchronizing circuits. Briefly, line-frequency synchronization is obtained by means of synchronizing-signal separator 20, electromechanical pulse-storage line 23, clipper 25, line-frequency sweep-signal generator 26, and deflection coils 27. Line-frequency synchronizing-signal pulses from separator 20 may contain extraneous noise pulses as well as the desired synchronizing-signal components. Electromechanical pulse-storage line 23 operates to discriminate between the desired synchronizing-signal pulses and the undesired noise pulses which, if permitted to be impressed on the input circuit of the line-frequency sweep-signal generator, might result in false synchronization and defective image reproduction.

The electromechanical pulse-storage line 23 is tuned to a fundamental natural resonant frequency substantially equal to the nominal repetition frequency of the line-synchronizing pulses. Moreover, pulse-storage line 23 is constructed and arranged to provide a closed path for wave propagation by multiple reflections of the impressed signals. Consequently, the line-frequency synchronizing-signal pulses, which recur at the fundamental resonant frequency of the storage line, grow in amplitude to an extent determined by the decrement of the storage line, while undesired noise pulses, which recur at an irregular rate unrelated to the resonant frequency of the pulse-storage line, are not permitted to build up in amplitude. Thus the electromechanical pulse-storage line 23 functions to expand selectively the synchronizing-signal pulses with respect to the undesired noise pulses. Amplitude-selective device or clipper 25 is adjusted to be responsive to the expanded synchronizing-signal pulses but not to the noise pulses of lower amplitude. The output of clipper 25 comprises pulses recurring at the line-scanning frequency and is substantially free from undesired noise-pulse components. Line-frequency synchronization is therefore assured.

In the event that several of the line-frequency synchronizing-signal pulses should be lost in transmission, as frequently occurs in practice, scanning synchronization is not interrupted owing to the storage properties of the electromechanical line. The number of line intervals over which the system is capable of maintaining synchronization in the absence of incoming synchronizing pulses is determined by the decrement of the pulse-storage line.

An electromechanical pulse-storage line suitable for use in the system of Figure 1 is shown in perspective in Figure 2 and in side elevation, partly in section, in Figure 3. The storage line includes a pair of passive vibratory elements 30 and 31 and a pair of active elements, namely an input transducer 33 and an output transducer 32. The active and passive elements are of substantially the same cross-sectional area and are arranged in adjoining coaxial relationship, with the input and output transducers adjacent each other and intermediate the passive vibratory elements. The composite structure comprising the active and passive elements is supported on a bracket 34 by means of a pair of rubber grommets 35 and 36 surrounding portions of passive elements 30 and 31 respectively. Grommets 35 and 36 are secured to bracket 34 in any suitable manner, as for example, by means of clamping wires 37 and 38 secured at each end to bracket 34. The exterior ends of the composite structure are left unsupported to permit multiple reflections in a manner analogous to those obtained with an electrical delay line having a short circuit at each end.

The over-all length of the composite line structure is substantially equal to one-half the effective wave-progagation velocity of the composite structure divided by the nominal repetition frequency of the line-synchronizing pulses. The effective wave-progagation velocity is dependent on the materials used and for a structure of the type illustrated, employing ceramic transducers and steel passive elements, may be about 4800 meters per second. In accordance with present television standards, the nominal repetition frequency of the line synchronizing pulses is 15,750 cycles per second. Consequently the over-all length of the composite line structure is approximately 6 inches. The elements are preferably of circular cross-section, the minimum diameter being determined by practical mechanical considerations and the maximum diameter being determined by the highest significant harmonic of the fundamental frequency. If the diameter is made too small, assembly of the element becomes difficult while if the diameter is made too large, excessive harmonic dispersion is encountered. The diameter of the composite line structure, or in case a non-circular cross-section is employed, the largest transverse dimension of the structure, must be smaller than one-half wavelength of the highest significant harmonic component. In practice, it has been found that harmonics above the ninth need not be accurately translated. Since, under the supposed assumption, a six-inch over-all length corresponds to one-half wavelength at the fundamental frequency, it is apparent that the largest transverse dimension of the line structure should be smaller than two-thirds of an inch. A diameter of from one-quarter inch to three-eighths inch has been found quite satisfactory.

While it is possible to excite the pulse-storage line and derive the output signals therefrom in any of a number of ways, it is preferred to employ piezo-electric transducers for the active elements 32 and 33. Specifically, it is preferred that these elements be constructed of a piezo-electric ceramic material comprising predominantly barium titanate or analogous material which is susceptible to permanent polarization after fabrication. In the embodiment of Figure 2, the composite line structure may be fabricated by forming a pair of cylindrical ceramic elements and silvering both ends of each cylinder. Passive vibratory elements 30 and 31 may be constructed of any of a number of materials capable of propagating wave energy in a longitudinal mode, and ordinary cold-rolled steel has been found quite suitable. The active and passive elements may be affixed to each other as shown in the drawing by any suitable means, as for example by soldering, to provide the desired mechanical intercoupling. After fabrication of the composite structure, terminal leads 39 and 40 may be secured to passive elements 30 and 31, thereby being placed in electrical contact with the exterior silvered surfaces of transducers 32 and 33 respectively. A third terminal lead 41 is connected to the mutually contacting silvered faces of transducers 32 and 33. The decrement of the line, which is largely dependent upon the amount of damping provided by the supports for the passive vibratory elements, may be adjusted by means of inserts 42 and 43 of suitable damping material, such as plasticized cellulose nitrate or the like, inserted between vibratory elements 30 and 31 and supporting grommets 35 and 36. The amount of damping, and hence the decrement of the storage line, is dependent, among other things, on the length and composition of the plastic inserts in the direction of wave propagation.

Ceramic elements 32 and 33 may be polarized so as to retain permanent piezo-electric properties, with the direction of the piezo-electric axis coincident with the axis of the composite line structure, by grounding terminal lead 41 and connecting terminal leads 39 and 40 to a suitable source of unidirectional operating potential (not shown). For best results, the electrostatic field within ceramic elements 32 and 33 should exceed 15,000 volts per centimeter and should be maintained for at least 10 or 15 minutes. After removal of the polarizing voltage, elements 32 and 33 will be found to retain the desired piezo-electric properties. The details of a preferred polarizing process are described in U. S. Patent No. 2,538,554, granted to Walter L. Cherry, Jr., on January 16, 1951, and assigned to the present assignee.

In the structure of Figure 2, element 33 is formed as a thin disc to provide a high input capacity to the storage line, while output transducer 32 is formed as a somewhat thicker disc to provide a high-voltage, low-capacity output.

While ordinary cold-rolled steel has been mentioned specifically as a suitable material for the passive vibratory elements, numerous other materials may be employed. Glass, ceramics, nearly any metal, and indeed most materials which may be characterized as hard, may be employed. However, it is preferred that the material of which the passive elements is constructed be of greater density than that of the material constituting the input and output transducers, in order to provide a high mechanical impedance. The use of barium titanate ceramic materials for the input and output transducers for the pulse-storage line is preferred not only for its convenience and high electromechanical conversion efficiency, but also because such materials provide high thermal stability. Steel, glass, and other materials suitable for use in constructing the passive vibratory elements of the pulse-storage line are all characterized by a negative temperature-coefficient of the elastic modulus. On the other hand, barium titanate ceramics have the unusual property of possessing a large positive temperature-coefficient of the elastic modulus. Consequently, the combination of barium titanate transducers with passive vibratory elements results in an advantageous temperature compensation effect. Since the velocity of wave propagation is proportional to the square root of the elastic modulus, it is apparent that the frequency stability of a line comprising barium titanate ceramic transducers is considerably enhanced by virtue of this temperature compensation effect.

Figure 4:
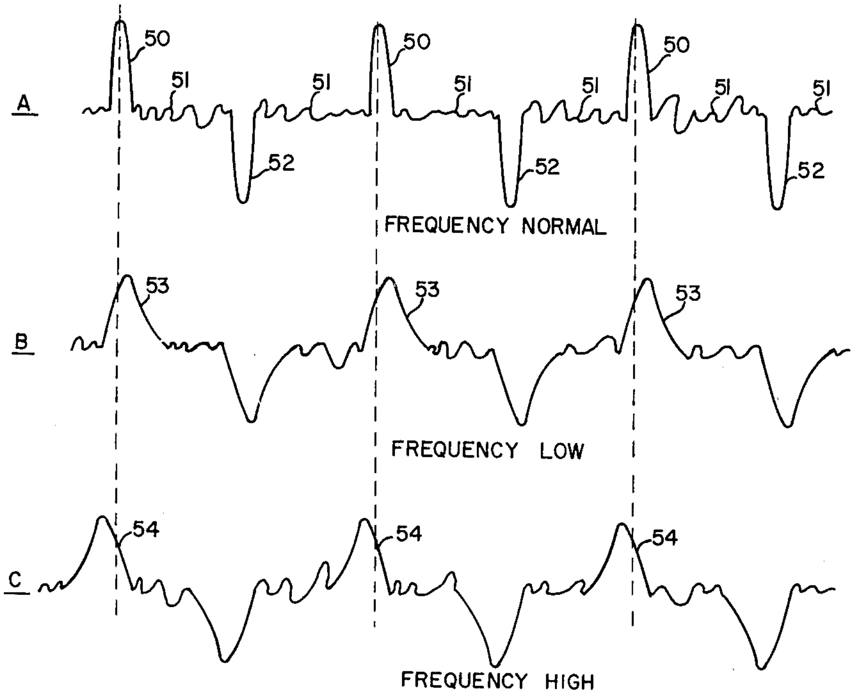
Figure 4 is a graphical representation useful in understanding the operation of the invention.

The operation of the pulse-storage line shown in Figures 2 and 3 may be readily understood by a consideration of those figures in connection with the graphical representation of Figure 4, which is a time plot of typical output signals from the pulse storage line under different operating conditions. Generally, when an input pulse is impressed on input transducer 33, that transducer is caused to expand or contract in a longitudinal or axial direction, depending upon the polarity of the pulse and the direction of polarization of the transducer. At nearly the same instant, an output pulse is developed by output transducer 32 in response to the stress applied to that transducer by the mechanical expansion or contraction of input transducer 33. Moreover, a longitudinal-mode dilatation or compression wave is propagated in both directions from the input transducer. These waves are reflected from the open ends of the structure with a 180-degree phase reversal, so that outgoing compressions are returned as incoming dilatations and vice versa. The reflected pulses traverse the output transducer 32 after a predetermined time delay dependent upon the length of the passive elements and the wave velocity therein. These elements are so proportioned that the entire line structure is of a length appropriate to provide a total time delay, from end to end, of one-half of an operating period at the repetition frequency of the line-synchronizing pulses, or an odd integral multiple of such half-periods. Since both ends of the line are mechanically open, each reflected pulse is again reflected and produces a second output pulse component in phase with that produced by the next succeeding incoming pulse. The process is cumulative, each successive reflection being of somewhat diminished amplitude owing to the attenuation characteristics determined by the decrement of the storage line.

While incoming noise pulses are also subjected to multiple reflection and produce numerous discrete output pulse components, such noise pulses generally recur at an irregular rate unrelated to the natural or resonant frequency of the storage line. Consequently, time coincidence between the output pulse components produced by the reflected waves and those produced by new incident noise pulses occurs only accidentally, and cumulative increase in the noise pulse amplitude is avoided. Thus the desired synchronizing-signal pulses are effectively expanded in amplitude with respect to the undesired noise pulses. Complete segregation of the expanded synchronizing-signal pulses from the unexpanded noise pulses may be obtained by applying the output of the pulse-storage line to the input circuit of an amplitude-selective device such as a self-biased peak clipper, the output of which may then be employed to drive the scanning circuits.

The output signal from the pulse-storage line under the operating condition that the repetition frequency of the incoming line-synchronizing pulses is exactly equal to the fundamental resonant frequency of the pulse-storage line is depicted by curve A of Figure 4. Under this operating condition, the output signal A comprises expanded synchronizing pulses 50 and extraneous noise pulses 51. For a pulse-storage line of the type shown in Figure 2, of an over-all length sufficient to provide a total time delay, from end to end, of one-half of a period at the nominal repetition frequency of the synchronizing-signal pulses, the output signal A also comprises reflected pulses 52 of opposite polarity from that of the synchronizing pulses 50. From the showing of curve A it is apparent that by passing the output signal from the pulse-storage line through a peak clipper, the noise signals 51 and the spurious reflected pulses 52 may be entirely rejected.

The condition of exact equality between the repetition frequency of the incoming synchronizing pulses and the fundamental resonant frequency of the pulse-storage line is an ideal one which is not encountered in practice for any protracted period of time, since the synchronizing-signal generators employed at the transmitter are conventionally operated at a frequency harmonically related to the power line frequency which is subject to considerable variation. It is therefore impractical to utilize the extremely high Q (defined as $\pi$ divided by the logarithmic decrement) obtainable with electromechanical lines since an extremely high-Q system is incapable of remaining in synchronism with an input signal which deviates appreciably in frequency. It is therefore necessary to strike a comprise between the desired high Q for insuring that the system remain operative during intervals when incoming synchronizing pulses may be lost and a relatively low Q to insure that the system remain in synchronism when the repetition frequency of the synchronizing pulses deviates owing to changes in the power-line frequency at the transmitter. As a practical matter, with frequency deviations of the order encountered in the operation of commercial television transmitters, it has been found that the Q of the electromechanical storage line should not exceed about 100 for reliable operation. Since the Q of an undamped electromechanical pulse-storage line may be of the order of 1000, it is necessary to provide damping for the line to reduce the Q. Such damping may be effected in the manner illustrated in Figures 2 and 3 by means of suitable damping material clamped about the passive vibratory elements. However, in the event that the line-scanning frequency is crystal-controlled or otherwise prevented from deviating materially from a predetermined standard, it is possible to employ substantially higher values of pulse-storage line Q with an attendant improvement in the stability of the system during intervals when the synchronizing pulses are lost in transmission.

Under conditions presently encountered in the transmission of television signals when the line-scanning frequency is harmonically related to the power-line frequency, the repetition frequency of the incoming synchronizing pulses may deviate as much as ½% of its nomial value. Curve B of Figure 4 represents the waveform of the output signal from the electromechanical pulse-storage line during an interval when the repetition frequency of the incoming synchronizing pulses is at its maximum deviation in a negative direction from the nominal line-scanning frequency. As compared with the condition of exact synchronism represented by curve A, the expanded synchronizing pulses 53 of curve B are somewhat broadened and decreased in amplitude but are still sufficiently greater in amplitude than the intervening noise pulses to permit complete separation of the expanded synchronizing pulses. Moreover, owing to the operating characteristics of the pulse-storage line, the peaks of the expanded synchronizing pulses deviate only very slightly in time from the position occupied by the peaks of the expanded synchronizing pulses 50 of curve A when the repetition frequency of the synchronizing pulses is exactly equal to the fundamental resonant frequency of the pulse-storage line.

Similarly curve C depicts the output waveform from the pulse-storage line under the condition of maximum frequency deviation in a positive direction; the expanded synchronizing-pulse peaks are again displaced only very slightly in time from the position which they would occupy under an operating condition of exact synchronism. By employing a self-biased peak clipper to separate the expanded synchronizing pulses from the noise, nearly perfect stability of the receiver scanning system is obtained.

Figure 5:
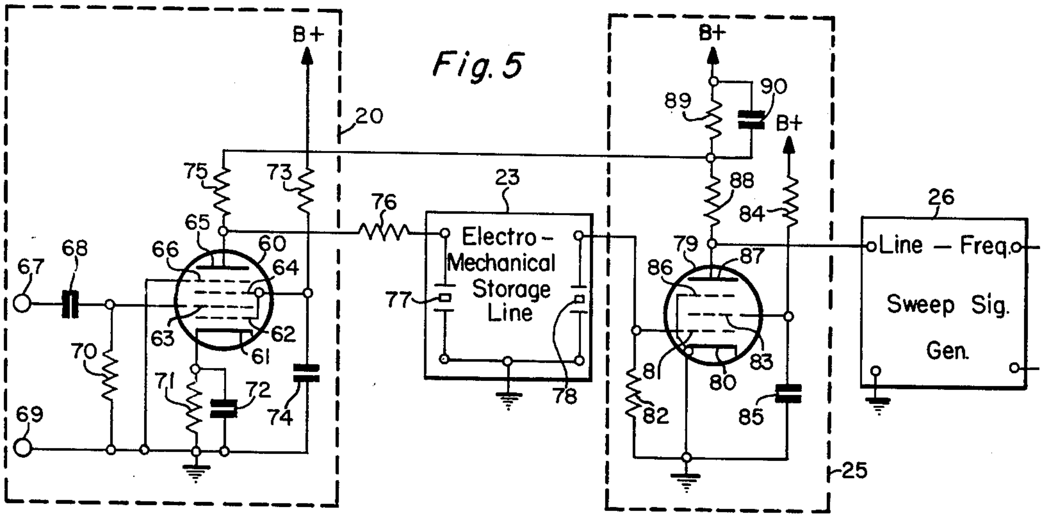
Figures 5–10 are schematic circuit diagrams of synchronizing apparatus embodying the invention.

The line-frequency synchronizing system of the receiver of Figure 1 is shown in greater detail in Figure 5. Synchronizing-signal separator 20 preferably comprises an electron-discharge device 60 of the gated-beam type comprising a cathode 61, a control system comprising an accelerating electrode 62 followed by an intensity-control grid 63, a second accelerating electrode 64, and an anode 65. One commercially available tube which is preferred for this application is that known as the type 6BN6 and also comprises a second control grid 66 between second accelerating electrode 64 and anode 65. One of the input terminals 67 is coupled to control grid 63 by means of a coupling condenser 68, and the other input terminal 69 is directly connected to ground. Control grid 63 is returned to ground through a grid resistor 70. Cathode 61 is connected to ground through the parallel combination of a biasing resistor 71 and a by-pass condenser 72. Accelerating electrodes 62 and 64 are connected together and to a suitable source of unidirectional operating potential, conventionally designated B+, through a dropping resistor 73, and a by-pass condenser 74 is connected between accelerating electrodes 62 and 64 and ground. If a 6BN6 or similar type tube is employed, the second control grid 66 may be returned directly to ground. Anode 65 is coupled to B+ through a load resistor 75.

Anode 65 of device 60 is coupled to an input terminal of electromechanical pulse-storage line 23 through an integrating resistor 76. The other of the input terminals is connected to one of the output terminals and to ground. The input and output transducers 77 and 78 are represented schematically as piezo-electric crystals shunted between the input terminals and between the output terminals respectively.

The output signal from electromechanical pulse-storage line 23 is coupled to the input circuit of an electron-discharge device 79. The cathode 80 of device 79 is directly connected to ground, and the input grid 81 is returned to ground through a grid resistor 82. The screen grid 83 of device 79 is connected to B+ through a dropping resistor 84 and is by-passed to ground by means of a condenser 85. The suppressor grid 86 is directly connected to cathode 80, and the anode 87 of device 79 is connected to B+ through a load resistor 88. Anode 87 is also coupled to the input circuit of line-frequency sweep-signal generator 26, which may be of any conventional type.

Synchronizing-signal separator 20 is substantially identical with that disclosed and claimed in the copending application of Erwin M. Roschke et al., Serial No. 94,642, filed May 21, 1949, for Signal-Slicing Circuits, now Patent No. 2,656,414, issued October 20, 1953, and assigned to the present assignee. Briefly, when a composite video signal comprising positively-oriented synchronizing-signal components is applied between input terminals 67 and 69, device 60 and its associated circuit components operate to select a slice or intermediate portion of the synchronizing-signal components, serving simultaneously as a top and bottom clipper. This operation is predicated on the step-function type transfer characteristic of the gated-beam tube, as described in detail in the above-identified copending application.

Owing to the fact that input transducer 33 represents a driver of high internal elastic impedance (stiffness), this transducer is not responsive to the instantaneous magnitude of the input signal but rather to the rate of change of such magnitude. Thus the electromechanical pulse-storage line effectively performs a differentiating operation on the input signal. On the other hand, since the output transducer 32 produces a voltage which corresponds directly to the pressure applied to it, no differentiating action is effected at the output of the pulse-storage line. If a pulse-type output signal is desired, it is necessary to provide means for performing an integrating operation in series with the pulse-storage line. It would appear that the integrating operation could be performed equally well at the input to or the output from the line. According to a feature of the invention, however, the inherent capacity of the input transducer is employed as the capacitive component of the integrating network and the internal resistance of the synchronizing-pulse source as at least a part of the integrating resistance. Not only does this arrangement provide the desired integrating effect with a minimum number of extra circuit elements, but it has been found that a greater output voltage is obtained in this manner than with any other circuit arrangement.

In the embodiment of Figure 5, resistor 76 is selected to provide, together with the inherent capacity of input transducer 77 and the internal resistance of synchronizing-signal separator 20, a charge time constant of at least the same order of magnitude as the duration of an individual line-frequency synchronizing-signal pulse. Preferably, this time constant is made substantially equal to the pulse duration. As a typical illustrative example, the inherent capacity of a barium titanate ceramic input transducer of suitable physical dimensions may be about 100 micro-microfarads, and the resistance of synchronizing signal-separator 20 during synchronizing-pulse intervals may be of the order of 10,000 ohms. According to present standards, the duration of an individual line-frequency synchronizing signal pulse is about 5 microseconds; consequently, resistor 76 should be about 40,000 ohms. However, during the interval between successive line-frequency synchronizing-signal pulses, device 60 is cut off and the impedance of the synchronizing-signal source is substantially equal to that of resistor 75 which in practice may be about 30,000 ohms. Consequently the discharge time constant of the integrating network is substantially greater than the charge time constant, with the result that a smaller inegrating resistor may be used than would otherwise be necessary to obtain a desired pulse shape while, at the same time, the attenuation of the output-pulse amplitude attributable to integration is reduced.

The output signal from pulse-storage line 23 is impressed upon the input circuit of device 79 which functions as a self-biased peak clipper in a manner well known in the art, the inherent capacity of output transducer 78 serving as the input coupling capacity. The output signal appearing across resistor 88 comprises substantially only negative-polarity pulses in synchronism with the line-frequency synchronizing-signal pulse components of the composite video signal applied between terminals 67 and 69. These pulses are employed to drive line-frequency sweep-signal generator 26.

If the line-frequency sweep-signal generator is of the type requiring a triggering pulse for each scanning cycle, provision must be made to prevent overloading of the circuit components during intervals when no synchronizing pulses are received. To this end, a feedback or keep-alive circuit may be provided effectively from the output to the input of the pulse-storage line. Although many types of feedback networks may be employed for this purpose, the desired results may be obtained by returning load resistor 75 of synchronizing-signal separator 20 to B+ through a small dropping resistor 89 connected in series with the load resistor 88 of the amplitude-selective device or clipper 25. Resistor 89 may be partly by-passed by a condenser 90 to insure fundamental-frequency excitation of the pulse-storage line by the feedback pulses.

Proper operation of a system of this type requires that there be enough feedback to maintain the system in operation in the absence of incoming synchronizing-signal pulses. On the other hand, even a weak input signal should be able to pre-empt control over the phase and waveform of the line output signal. Thus the system bears a superficial resemblance to a synchronized oscillator; however, it differs from such a locked oscillator arrangement in that even a weak signal-pulse provides considerably more input to the pulse-storage line than the feedback pulse. This type of operation is predicated on the property of a self-biased peak clipper of providing a substantially constant output-pulse amplitude over a wide range of input-signal levels, and may most conveniently be explained by means of an illustrative example.

If it is assumed that the output from the pulse-storage line, unaided by feedback, is 12 volts in response to an applied input signal from the synchronizing-signal separator of 30 volts, a 15-volt feedback pulse superimposed on the output of snychronizing-signal separator 20 causes the line output signal to increase to 18 volts. It may be assumed that the self-biased peak clipper, when driven with 18 volts, is capable of providing a 15-volt feedback pulse so that the described condition is stable. Now if the input signal to the synchronizing-signal separator should be suddenly removed so that only the feedback pulse from the self-biased peak clipper is applied to the input of the pulse-storage line, the output signal of the self-biased peak clipper drops by a much smaller percentage than the input to the clipper. It may, for instance, be assumed that the feedback pulse drops from 15 volts to 10 volts when the input to the clipper is reduced from 18 volts to 4 volts. With a 10-volt input signal, the line output applied to the input circuit of the self-biased peak clipper will be 4 volts, since the pulse-storage line is a linear device, so that this operating condition, in the absence of incoming synchronizing pulses, is again stable. Consequently, it is insured that even a weak signal may pre-empt control over the phase of the output from the pulse-storage line if the feedback signal is less than half the strength of a normal input signal; preferably, the ratio of feedback voltage to normal input voltage should be about one-half. This type of operation contrasts sharply with that inherent in a conventional synchronized oscillator circuit, wherein the feedback signal is of much greater amplitude than the controlling signal.

Figure 6:
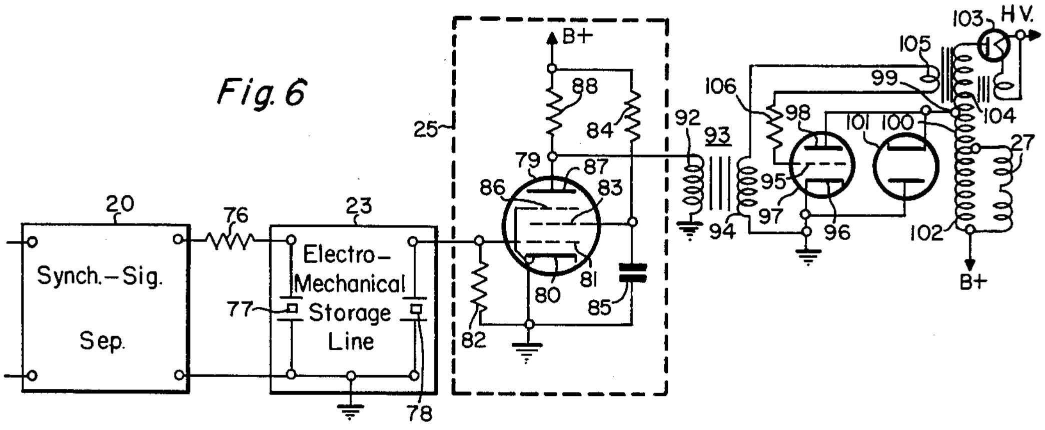

In the event that line-frequency sweep-signal generator 26 is of the self-sustaining type, the feedback or keep-alive circuit may be omitted. A circuit of this type is illustrated in Figure 6, in which the output signal of the peak clipper 25 is impressed upon the primary winding 92 of a transformer 93. The secondary winding 94 of transformer 93 is coupled between the control grid 95 and the cathode 96 of a triode 97. The anode 98 of triode 97 is connected to a tap 99 on an output transformer winding 100 which in turn is connected to B+. A diode 101 is connected in parallel with triode 97 but with inverse polarity. The line-frequency deflection coils 27 are connected in parallel with a portion 102 of transformer winding 100. A diode 103 and a high-voltage winding 104 are provided in a well known manner to produce high voltage for application to the final anode of cathode-ray tube 16. A feedback winding 105, coupled to high-voltage winding 104, and a series resistor 106 are included in the input circuit of triode 97. If desired, triode 97 and diode 101 may be included in a common envelope, suitable provision being made to insulate the diode cathode, which is operated at a high potential, from its associated heater element (not shown).

Triode 97 and diode 101 together constitute an electronic switch for passing current in either direction, depending upon the instantaneous polarities of the several electrodes. The electronic switch is triggered by negative-polarity pulses appearing across load resistor 88 and applied to the control grid 95 of triode 97 by means of input transformer 93. The feedback from high-voltage winding 104 to control grid 95 through feedback winding 105 is adjusted to insure self-sustaining operation at a frequency slightly lower than the line-scanning frequency in the absence of incoming triggering pulses. As a consequence, it is unnecessary to provide a feedback circuit to the input of storage line 23.

Figure 7:
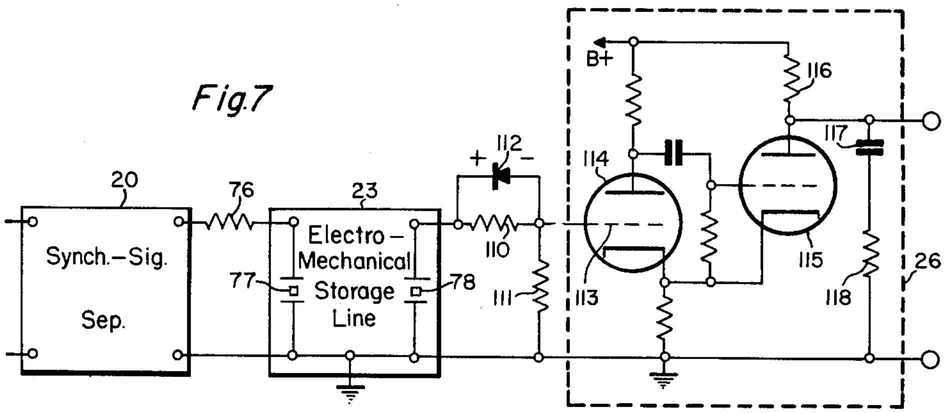

Another type of self-sustaining sweep system is shown in the circuit of Figure 7. The output signal from electromechanical pulse-storage line 23 is impressed on the series combination of a large resistor 110 and a small resistor 111, and a rectifier or other unilaterally conducting device 112 is connected in parallel with the large resistor 110. The voltage appearing across resistor 111 is applied to the input grid 113 of a cathode-coupled multivibrator comprising a pair of electron-discharge devices 114 and 115. The output signal appearing across a load resistor 116 is impressed across the series combination of a condenser 117 and a resistor 118 to provide a peaked saw-tooth output voltage which may then be amplified by conventional means (not shown) and applied to the line-frequency deflection coils. The construction and operation of the cathode-coupled multi-vibrator are conventional.

The circuit comprising resistors 110 and 111 and rectifier 112 serves as an amplitude-selective device or clipper to separate the expanded synchronizing pulses from the undesired noise pulses, and the negative pulses appearing across resistor 111 are employed to trigger the cathode-coupled multi-vibrator.

The systems thus far described have been found to provide performance which is comparable to that obtained with a conventional automatic frequency control system, but at a greatly reduced cost, whenever the input signal is of sufficient strength to insure that the line-frequency synchronizing pulses are subjected to both top and bottom clipping by the synchronizing-signal separator. However, a different situation obtains under weak-signal conditions. Under such conditions, the signal applied to the synchronizing-signal separator contains a certain amount of random noise which is characterized as continuous noise of substantially constant amplitude attributable to thermal agitation or the like and produced in the receiving apparatus. Such random noise is superposed on the desired synchronizing pulses to be applied to the input of the electromechanical pulse-storage line. Noise of this type, herein referred to as random noise to distinguish it from ignition noise and similar impulse-type disturbances, is found to result in random changes in the positioning of some picture lines relative to that of others. In order to overcome effects of this sort, an arrangement such as that schematically shown in Figure 8 may be employed.

Figure 8:
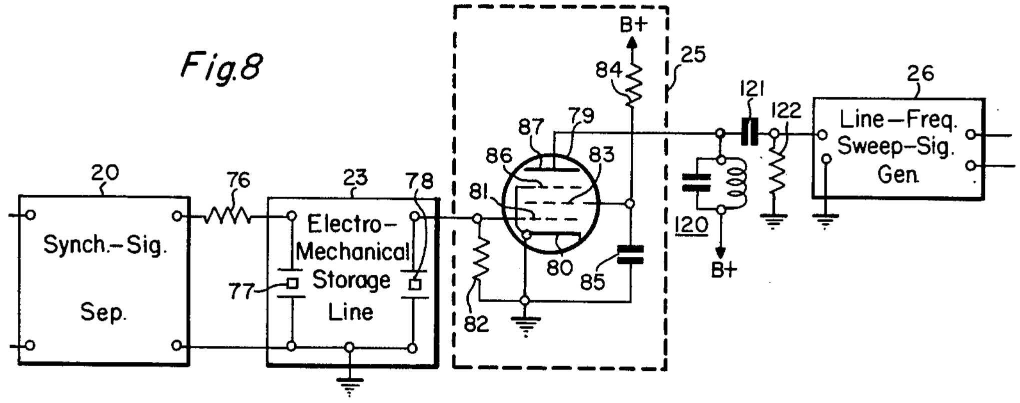

The embodiment of Figure 8 is generally similar to that of Figure 6. In addition to the basic combination of an electromechanical pulse-storage line and a peak clipper, however, a singly-resonant passive oscillatory circuit or ringing circuit 120, having a Q of from 10 to 50 and tuned to the nominal repetition frequency of the line-synchronizing pulses, is inserted between the clipper 25 and the line-frequency sweep-signal generator 26. The signal developed across ringing circuit 120 is impressed on a differentiating circuit comprising a coupling condenser 121 and a shunt resistor 122, and the differentiated signal appearing across resistor 122 is employed to drive the sweep-signal generator. Since pulse-storage lines are generally of higher Q than ringing circuits, one might assume that cascading the ringing circuit with the line would afford no useful results. In fact, it has been found that the connection of a second pulse-storage line in cascade with the first leads to no appreciable improvement in operation. However, a surprisingly great improvement is obtained by connecting a ringing circuit in cascade with the pulse-storage line. It has been found that the electromechanical pulse-storage line 23 is primarily effective in eliminating undesired ignition noise pulses and the like but is substantially less effective in eliminating random noise superposed on the line-synchronizing pulses during weak-signal reception. On the other hand, ringing circuit 120 is extremely effective in eliminating the phase instability of the sweep-driving pulses caused by random noise passed by the pulse-storage line. In practice, it has been found that the combination shown in Figure 8 performs comparably with conventional automatic frequency control systems even under the most adverse signal conditions for which picture reproduction is at all obtainable.

Figure 9:
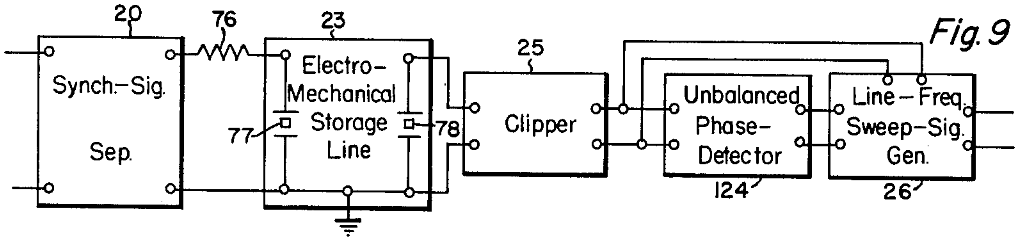

In the system of Figure 9, an unbalanced phase detector is employed in place of the oscillatory circuit of Figure 8 to reject undesired random noise. The output from amplitude-selective device or clipper 25 is compared in phase, by means of an unbalanced phase detector 124, with a suitable pulse-type signal derived from line-frequency sweep-signal generator 26, and the unidirectional control potential developed by phase detector 124 is employed to control the frequency of line-frequency sweep-signal generator 26. In other respects the system of Figure 9 is identical with that shown in Figure 8.

Unbalanced phase detectors are well known in the art and are quite frequently employed in present-day commercial television receivers to provide an automatic-frequency-control potential in the line-frequency synchronizing-signal circuits. While systems of this type are considerably more economical than balanced automatic-frequency-control systems, they are quite inferior to the balanced systems in the presence of impulse noise, owing to the unbalanced nature of the circuit. On the other hand, an unbalanced phase detector is quite effective in rejecting undesired random noise. In the arrangement of Figure 9, electromechanical pulse-storage line 23 and clipper 25 effectively remove the unbalance effect by rejecting undesired impulse noise, and the performance of the combined system is substantially equivalent to that of automatic-frequency-control arrangement employing a balanced phase detector.

In accordance with the present governmental standards established for the transmission of television signals, equalizing pulses having a repetition frequency equal to twice that of the line-frequency pulses are transmitted for several line intervals at the beginning of each field-frequency blanking pulse for the purpose of effecting double-interlace scanning. With an electromechanical pulse-storage line of the type described, no energy storage is effected during the equalizing pulse intervals since the pulse-storage line is not responsive to the even harmonics of the fundamental natural resonant frequency. Consequently, some discontinuity in the output of the pulse-storage line is encountered during the field-frequency blanking interval. In order to make the system responsive to the second harmonic of the fundamental natural resonant frequency of the storage line, an arrangement such as that shown in Figure 10 may be employed.

Figure 10:
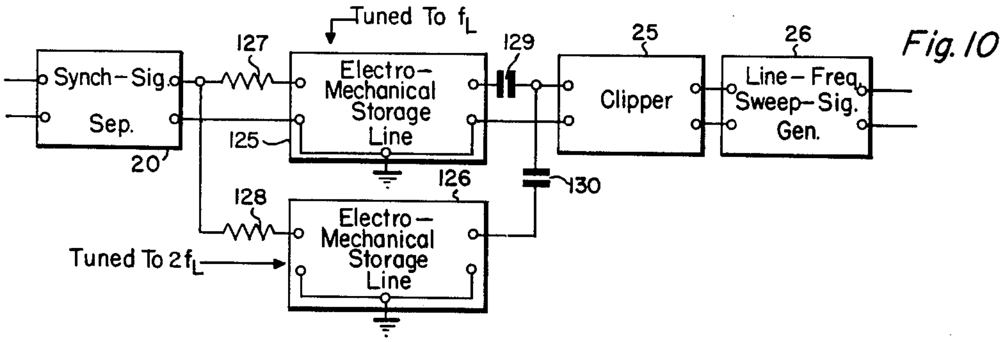

In Figure 10, the line-frequency synchronizing-signal pulses from synchronizing-signal separator 20 are applied to each of two electromechanical pulse-storage lines 125 and 126 by means of respective integrating resistors 127 and 128. The output signals from the two lines 125 and 126 are combined, and the combined signal so obtained is impressed on the input circuit of clipper 25. Electromechanical pulse-storage line 125 is tuned to the nominal repetition frequency $f_L$ of the line-synchronizing pulses while electromechanical pulse-storage line 126 is tuned to the second harmonic of $f_L$. Condensers 129 and 130 are provided to prevent undesirable interaction between lines 125 and 126.

In operation, electromechanical pulse-storage line 125 is responsive only to signal components of a frequency equal to the repetition frequency of the line-synchronizing pulses and odd harmonics thereof. Consequently, line 125 is incapable of responding during equalizing pulse intervals since the equalizing pulse repetition frequency is twice the line-synchronizing frequency. However, since the second pulse-storage line 126 is tuned to twice the line-synchronizing pulse repetition frequency (or to the equalizing pulse repetition frequency), the output of pulse-storage line 126 contains components not present in the output of line 125, namely the second, sixth, tenth, fourteenth, etc. harmonics of the line-synchronizing pulse repetition frequency. As a result, discontinuities during equalizing pulse intervals are substantially avoided.

While the two pulse-storage lines have been shown in a system in which both the input circuits and the output circuits are respectively connected in parallel, it is contemplated that the output circuits may be coupled in series to effect the same result.

Figure 11:
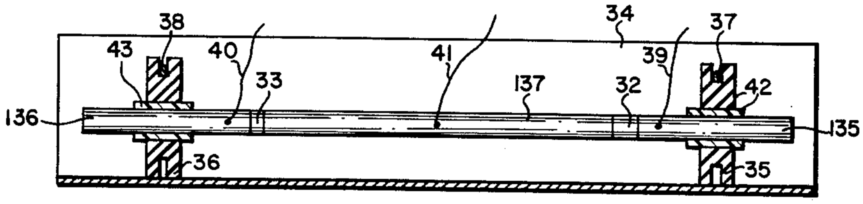
Figures 11 and 12 are elevational views, partly in section, of other electromechanical pulse-storage lines embodying the invention.

Figure 11 is a side elevation, partly in section, of another form of electromechanical pulse-storage line suitable for use in the system of the present invention. The line of Figure 11 comprises three passive vibratory elements 135, 136 and 137 with intermediate input and output transducers 33 and 32, all the active and passive elements being of substantially the same cross-sectional area. The composite line structure is supported by means of grommets 35 and 36, and suitable inserts 42 and 43 of plastic or other damping material are provided to insure the desired Q. The line is again constructed and supported to permit multiple reflections from each end. The lengths of the two external vibratory elements 135 and 136 are each equal to substantially one-half the length of the intermediate passive vibratory element 137, and the over-all length of the composite line structure is sufficient to provide a time delay, from end to end, of substantially one period (or an integral multiple thereof) at the line-synchronizing pulse repetition frequency. Transducers 32 and 33 are spaced from the respective ends of the composite structure by one-fourth (or an odd integral multiple thereof) of the effective wave-propagation velocity divided by the nominal repetition frequency of the line-synchronizing pulses. Operation of the structure of Figure 11 is functionally equivalent to that of the arrangements of Figures 2 and 3, and the output signal obtained with a pulse-storage line of the type shown in Figure 11 is of the same character as that indicated graphically in Figure 4.

Figure 12:
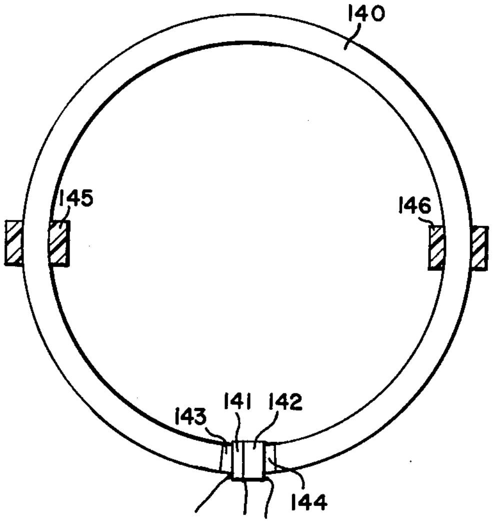

Figure 12 is an elevational view of another type of electromechanical pulse-storage line constructed in accordance with the invention. The structure of Figure 12 comprises a single passive vibratory element 140 formed as an incomplete loop, and the input and output transducers 141 and 142 are inserted in the gap in passive vibratory element 140, being affixed thereto by means of insulating inserts 143 and 144 to prevent short-circuiting of the input and output terminals. Active elements 141 and 142 are of substantially the same cross-sectional area as passive element 140. Suitable damping supports 145 and 146 are provided for the passive vibratory element. The circumferential dimension of the structure is such as to provide a time delay of a full period at the line-synchronizing pulse repetition frequency. Pulses impressed on input transducer 141 contribute an output component at each integral multiple of one operating period. The line is therefore responsive to even harmonics as well as odd harmonics of the repetition frequency of the input pulses. Some difficulty may be encountered in suppressing undesired bending modes, although this may be achieved by constructing the passive element 140 with a preferred cross-sectional shape. Consequently, the simple structure of Figures 2 and 3 is preferred.

While the line constructions of Figures 2, 3 and 11 on the one hand Figure 12 on the other appear physically quite different, the latter being responsive to all harmonics of the fundamental frequency while the former is responsive only to odd harmonics thereof, both types of structure have one characteristic in common. In each, the composite line structure presents a closed path for wave propagation, be it through reflections at free ends or by virtue of a re-entrant shape. As used throughout the specification and claims, a "closed path for wave propagation" is defined as a transmission path for pulses issuing from the input transducer to return periodically thereto with but little attenuation during each period. In the structure of Figure 12, a physically closed continuous path is presented, while in the constructions of Figures 2, 3 and 11 the closed path for wave propagation includes the reflecting terminations of the composite line structure.

While it is preferred, primarily for efficiency reasons, to employ piezo-electric transducers for impressing the input pulses on the pulse-storage line and for deriving the output pulses therefrom, it is apparent that other types of transducers may be employed for this purpose, as for example magnetostrictive or electrodynamic transducers. Moreover, other modes than the longitudinal mode may be employed, as for example the shear mode. For optimum performance and minimum space requirement, the pulse-storage line should have a fundamental frequency substantially equal to the nominal repetition frequency of the line-synchronizing pulses, but suitable operation may also be achieved with pulse-storage lines having fundamental resonant frequencies equal to other harmonics than the first harmonic, or fundamental frequency, of the pulse repetition frequency.

Thus the present invention provides a new and improved synchronizing system for use in a television receiver or similar apparatus. Performance comparable to that obtainable with automatic frequency control arrangements now in common use may be obtained at a substantially reduced cost and with a material simplification in the manufacture of the equipment. In the event that future developments should include crystal-control or other stabilization of the synchronizing-pulse repetition frequency employed at transmitting stations, still greater stability may be expected.

Certain features of the synchronizing system taught in the present application have been disclosed and claimed in copending application Serial No. 308,217, filed September 6, 1952, and assigned to the present assignee.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. An electromechanical pulse-storage line comprising: a composite line structure composed of an electromechanical input transducer, an electromechanical output transducer coaxially adjoining said input transducer, and a pair of passive vibratory elements mechanically intercoupled with said transducers in coaxial relation therewith to provide a closed path for wave propagation by multiple reflection.

2. An electromechanical pulse-storage line comprising: a pair of longitudinally aligned passive vibratory elements; an electromechanical input transducer coaxially adjoining one of said passive elements; and an electromechanical output transducer coaxially adjoining said input transducer and the other of said passive elements.

3. An electromechanical pulse-storage line comprising: a pair of longitudinally aligned passive vibratory elements; a piezo-electric ceramic input transducer coaxially adjoining one of said passive elements; and a piezo-electric ceramic coutput transducer having a greater axial length than said input transducer and coaxially adjoining said input transducer and the other of said passive elements.

4. An electromechanical pulse-storage line comprising: a pair of longitudinally aligned passive vibratory elements; an electromechanical input transducer coaxially adjoining one of said passive elements; and an electromechanical output transducer coaxially adjoining said input transducer and the other of said passive elements, said transducers and said passive elements being of substantially equal cross-sectional area.

5. An electromechanical pulse-storage line comprising: a pair of longitudinally aligned passive vibratory elements; a piezo-electric ceramic input transducer coaxially adjoining one of said passive elements; and a piezo-electric ceramic output transducer coaxially adjoining said input transducer and the other of said passive elements.

6. An electromechanical pulse-storage line comprising: a pair of longitudinally aligned passive vibratory elements; an electromechanical input transducer coaxially adjoining one of said passive elements; an electromechanical output transducer coaxially adjoining said input transducer and the other of said passive elements; and means for mounting said pulse-storage line comprising supports for said passive elements.

7. An electromechanical pulse-storage line comprising: a pair of longitudinally aligned passive vibratory elements; an electromechanical input transducer coaxially adjoining one of said passive elements; an electromechanical output transducer coaxially adjoining said input transducer and the other of said passive elements; and means for mounting said pulse-storage line comprising damping supports for said passive elements.

8. An electromechanical pulse-storage line comprising: a pair of longitudinally aligned passive vibratory elements; an electromechanical input transducer coaxially adjoining one of said passive elements; an electromechanical output transducer coaxially adjoining said input transducer and the other of said passive elements; and means for mounting said pulse-storage line comprising supports for said passive elements spaced from the ends thereof.

9. An electromechanical pulse-storage line comprising: a pair of longitudinally aligned passive longitudinal-mode vibratory elements; a longitudinal-mode piezo-electric ceramic input transducer coaxially adjoining one of said passive elements; a longitudinal-mode piezo-electric ceramic output transducer coaxially adjoining said input transducer and the other of said passive elements, said transducers and said vibratory elements being of substantially equal cross-sectional area; and means for mounting said pulse-storage line comprising damping supports for said passive elements spaced from the ends thereof.

10. A piezo-electric pulse-storage line comprising: a composite line structure composed of a piezo-electric input transducer, a piezo-electric output transducer adjacent to and mechanically intercoupled with said input transducer, and at least one passive vibratory element mechanically intercoupled with said transducers to provide a closed path for wave propagation.

References Cited in the file of this patent

UNITED STATES PATENTS

| | | |
|---|---|---|
| 1,693,806 | Cady | Dec. 4, 1928 |
| 1,955,471 | Pooler | Apr. 17, 1934 |
| 2,101,272 | Scott | Dec. 7, 1937 |
| 2,263,902 | Percival | Nov. 25, 1941 |
| 2,361,998 | Fleming-Williams | Nov. 7, 1944 |
| 2,423,306 | Forbes | July 1, 1947 |
| 2,486,560 | Gray | Nov. 1, 1949 |
| 2,571,019 | Donley et al. | Oct. 9, 1951 |
| 2,590,405 | Hansell | Mar. 25, 1952 |
| 2,612,603 | Nicholson | Sept. 30, 1952 |
| 2,711,515 | Mason | June 21, 1955 |